May 18, 1943.   F. J. HORTON   2,319,684
SPRING CONSTRUCTION
Filed May 17, 1941
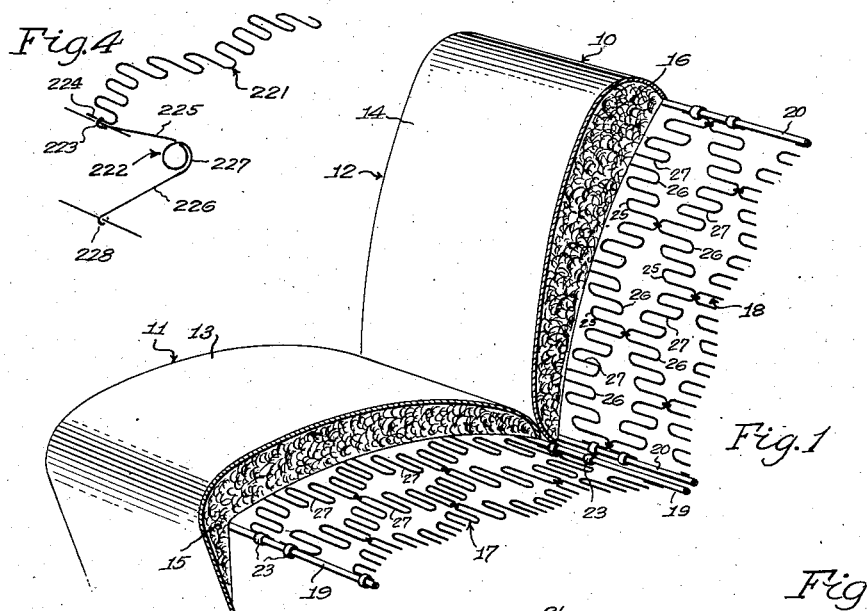
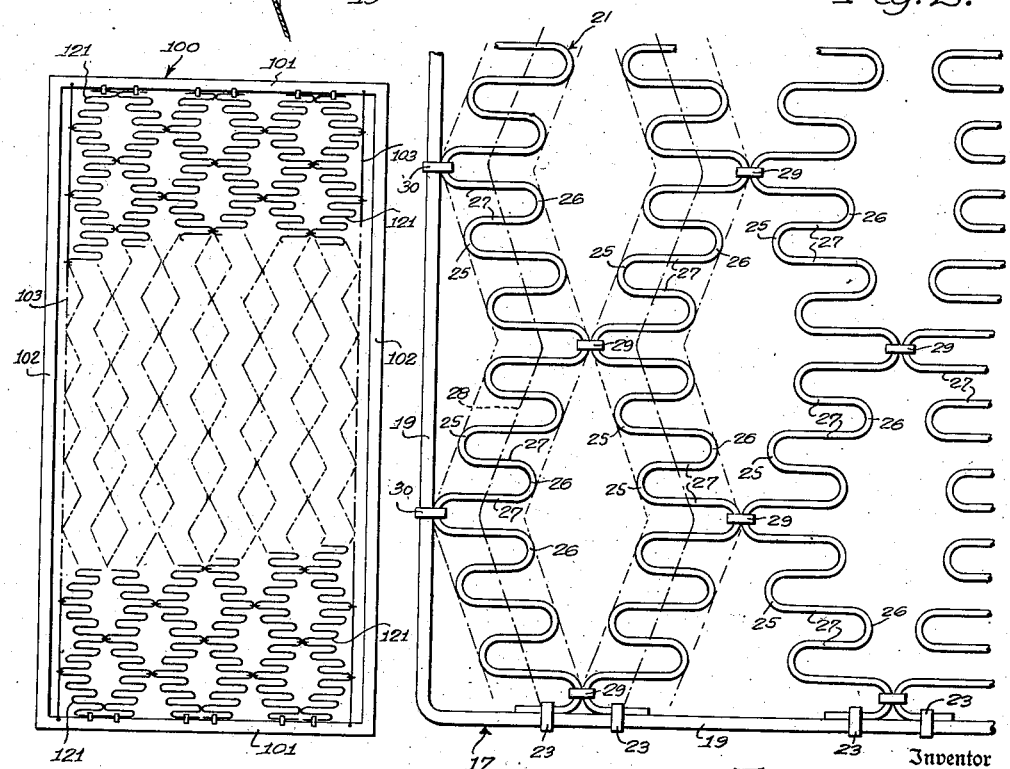
Inventor
Frank J. Horton Patented May 18, 1943

2,319,684

UNITED STATES PATENT OFFICE 2,319,684

SPRING CONSTRUCTION

Frank J. Horton, Detroit, Mich., assignor to F. L. Jacobs Company, Detroit, Mich., a corporation of Michigan Application May 17, 1941, Serial No. 393,913

4 Claims. (Cl. 155—179)

This invention relates to spring constructions, and, in particular, to spring structures for vehicle seats, furniture and the like.

One object of this invention is to provide a spring structure for seats, beds and the like which will have resilience not only longitudinally of the spring but also laterally thereof.

Another object is to provide such a spring structure wherein the spring is substantially flat, yet which has resilience both in the direction of the length of the spring and laterally thereof.

Another object is to provide a spring structure wherein the spring is substantially flat or arcuate and has a resilience lengthwise of the spring as well as crosswise in the plane of the spring.

Another object is to provide a spring structure composed of undulatory flat springs, the center lines of the springs being also undulatory or zig-zag.

Another object is to provide a spring structure as set forth in the preceding objects, wherein the center lines of adjacent spring units are zig-zag in opposite directions and are connected to one another at their points of nearest approach, whereby the lateral resilience of the spring units are transmitted to other spring units.

Another object is to provide a spring unit for vehicle seats or furniture and the like wherein the spring unit consists of an undulating member, the undulations of which are substantially flat in at least one direction and which has a center line of zig-zag or undulating form.

Another object is to provide a spring unit for vehicle seats, furniture and the like wherein the spring unit consists of an undulatory spring rod or wire, the undulations of which are substantially flat in one direction and which are of approximately equal widths or amplitudes, the center line of each unit being likewise zig-zag.

Another object is to provide a spring structure for vehicle seats or furniture which shall be substantially flat in one direction, although possibly arcuate in another direction, this flatness facilitating the support of the upholstery or padding and having lateral as well as longitudinal resilience without the necessity for interconnecting spiral springs or other similar expedients.

In the drawing:

Figure 1 is a perspective view of a spring structure according to the present invention applied to a seat bottom and a seat back, either for vehicles or furniture.

Figure 2 is an enlarged fragmentary plan view of a corner of the spring structure shown in Figure 1.

Figure 3 is a plan view of the spring structure of the invention as applied to a cot or bed, with the springs extending longitudinally rather than laterally.

Figure 4 is a fragmentary perspective view of a modified spring unit employing a lever arm at one end instead of being fastened directly to the edge wire.

General arrangement

In furniture, vehicle seats and the like, one serious problem has been to provide a spring structure which shall be resilient in different directions and yet which shall adequately and evenly support the upholstery or padding without bunching or protruding. Coil springs, when used for this purpose, have been interconnected by other springs or wires in the attempt to provide a flat top or a smooth support for the upholstery. In practice, however, it has been difficult, if not impossible, to provide springs which shall have even properties over their period of life, with the result that after a period of use, certain of the springs possess less resilience than others and the surface of the seat or article of furniture sags in certain places.

Moreover, where coil springs have been so used, it has been difficult to provide secure anchorages or connections of the springs to their edge wires or connecting members. After a period of severe use, such springs have frequently become loose from their connections and have worked their way up through the upholstery, thereby requiring the padding to be removed in order to repair the spring structure. Where several of the springs have thus failed, even though they do not protrude, their resilience is impaired and the cushion or pad presents lumps and uneven supporting qualities. The manufacture of seats, beds and the like employing seat structures consisting of coil springs interwoven with wires or spiral springs has been difficult and expensive, due to the large amount of hand work in the process of manufacture, and in the necessity for insuring that secure connections shall have been made between all of the springs and the remainder of the structure. Particularly in vehicles such coil spring structures have become objectionable because of the large amount of space which they require—space which could be more conveniently utilized for tools, baggage or other purposes. This large amount of space, particularly in a vertical direction, which has been necessary in the employment of coil springs in vehicle seats, has recently become a difficult problem in view of the public demand for lower and more "streamlined" vehicles. In order to reduce the height of these vehicles, it has been desirable to place the seat cushions nearer the floor, yet in doing so, the space required for the proper working of coil springs has been cut down to an inadequate amount.

The difficulties inherent in coil springs in the design of modern vehicle seats and furniture have led many manufacturers to adopt the so-called "flat spring." Such flat springs consist generally of an undulatory spring wire or rod which is of sinuous form. Prior flat springs of this type have had substantially straight center lines when looked at in plan view, although the center line may be arcuate in side elevation. Such flat springs have reduced the amount of labor previously necessary in the manufacture of vehicle seats or furniture and accordingly have been more desirable from the viewpoint of mass production and straight line assembly.

While these flat springs have been resilient in the directions of their length and also transversely to the flat portions of the spring, such as in a vertical direction when the springs are used for seats, however, they have been seriously lacking in resilience in a lateral direction, or along the seat. To remedy this defect, attempts have been made to interconnect the flat springs with spiral springs or to provide other auxiliary methods of giving lateral resilience.

The present invention, however, provides a so-called flat spring which has resilience along the spring and perpendicular to its flat portions, and also has resilience in a lateral direction as well. This lateral resilience is provided by making the wire or rod of the spring undulate to and fro across a center line which in itself is of sinuous or undulatory form. The undulations of the spring are preferably made of substantially equal amplitudes so as to give the spring substantially even resilience at different points in its length— making a flat spring with undulations of variable amplitudes gives variable resilience at different portions of the spring.

The flat spring units of the present invention, with their sinuous center lines, are assembled side by side in opposed pairs—that is, with the center lines of adjacent spring units undulating in opposite directions (Figure 2). This causes the spring units to approach each other at spaced locations, at which locations they are connected to one another. In a given seat or furniture article, such as a vehicle seat bottom or back, the connections between successive spring units alternate in location so that the connections are spaced the maximum distance apart, thus giving the maximum resilience to the construction.

For purposes of simplicity, the spring structure of the present invention has been shown as applied to spring units which terminate directly at the edge wires of the seat or bed. The spring units of the present invention, however, may be provided with lever arms at one or both ends, if desired, as shown in Figure 4.

Spring construction

Referring to the drawing in detail, Figure 1 shows an article 10 with a seat 11 and back 12 which may be either for a vehicle, such as an automobile, or for a piece of furniture, such as an armchair, davenport or the like. The seat 11 and back 12 are provided with coverings 13 and 14, beneath which is padding 15 and 16 respectively.

Supporting this upholstery are seat and back spring assemblies 17 and 18 respectively provided with edge wires 19 and 20. For purposes of illustration, the construction of the seat spring assembly 17 with its edge wire 19 will be described, the construction of the back spring assembly 18 being similar, although not necessarily the same.

The spring assembly 17 is provided with a plurality of spring units generally designated 21 secured at their ends 22 to the edge wire 19 by means of connectors 23 (Figure 2). The spring unit 21 consists of a spring wire or rod 24 having undulations 25 and 26 extending alternately in opposite directions and having straight portions 27 therebetween. The rounded portions 25 and 26 thus roughly resemble the crests and troughs of a wave. The torsion effect which produces the resilience, however, is provided mainly by the twisting action or torsion within the straight portions 27. In order to provide approximately even resilience from one end of the spring to the other, the amplitudes of the undulations as measured by the distances between the spring center line 28 and the turning points 25 and 26 are substantially equal to one another and approximately constant throughout the length of the spring unit 21.

In order to provide lateral resilience, as well as to enhance the upholstery supporting qualities of the spring assembly 17 and 18, the spring unit 21 is caused to undulate as to its center line 28 as well as in its individual undulations 25, 26, 27. In other words, while the spring wire or rod 24 is performing its minor undulations, it does so, not on either side of a straight center line, but on either side of a zig-zag or undulating center line 28. It will be understood that the term "sinuous," as used herein, refers to undulations generally and not merely to the limited form of undulation known to mathematicians as a sine curve.

The adjacent spring units 21 in the spring assemblies 17 and 18 are of similar but opposite constructions—that is, their center lines 28 undulate in opposite directions so that they provide points of minimum approach alternating with points of maximum separation. This construction enables the adjacent spring units 21 to be directly connected to one another at their points of nearest approach by connectors 29. These connectors 29 serve to transmit the resilience of one spring to another and thus to distribute an uneven load over the entire surface of the spring assembly. Where the spring units 21 approach most closely to the edge wires 19 or 20, they are connected thereto by edge connectors 30 (Figure 2). In this manner, the individual spring units 21 are connected to each other by the connectors 29, and are also connected to the edge wires 19 or 20 by the end connectors 23 and edge connectors 30.

Operation

In the manufacture of the spring units 17 and 18, the principles of mass production and straight line assembly are facilitated over previous spring assemblies by the simplification brought about through the spring unit of the present invention. The direct connection of the spring units 21 to each other and to the edge wires 19 or 20 makes the final assembly of the seat assembly 17 and 18 rapid and simple, with a resulting low cost of production. This direct connection eliminates the need for inserting coil springs, spiral springs or links between the flat springs and, accordingly, reduces the number of operations required. The form of the spring unit 21 with its sinuous center line 28 gives each spring unit the maximum supporting effect for the upholstery, hence this can be applied rapidly and evenly in the remaining operations.

In the use of the article, either as a vehicle seat or as a piece of furniture, the application of the load either against the seat 11 or back 12 causes the latter to be sustained by the spring units 21 and transmitted through the connectors 29 to adjacent spring units. The minor sinuous form of the spring with the turning portions 26 and the straight sections 27 provides resilience lengthwise of the spring and also in a direction approximately perpendicular to the flat portions of the spring—that is, in a direction approximately perpendicular to the seat 11 or back 12. The major sinuous form of the spring as brought about by its undulation along a sinuous center line 28, moreover, imparts lateral resilience to the spring unit 21, that is, in a direction along the surface of the seat 11 or back 12. This lateral resilience is transmitted through the connectors 29, and is brought about chiefly by the torsional effects arising in the straight portions 27 by the successive connectors 29 along the center line 28 of the spring unit 21. At the same time, the approximately constant amplitude of the minor undulations 25 and 26 on opposite sides of the sinuous center line 28 gives the spring unit 21 approximately equal and constant resilience in different portions of its length. Thus the spring units 21 have a double action as to their resilience, namely, crosswise of the unit as well as lengthwise thereof. In contrast to this, the ordinary flat spring of the undulating type, which has a straight center line 28, almost wholly lacks lateral resilience. The insertion of spiral connection springs in the effort to give lateral resilience to these straight flat springs adds to the cost and complexity and increases the danger of breakdown during use.

The simplicity of construction of the spring units 21 of the invention and of the spring assemblies 17 and 18 as a whole renders the likelihood of breakdowns very remote during the life of the vehicle or article of furniture. The elimination of short and small spiral springs eliminates weak elements which are liable to failure in the ordinary spring assemblies. The spring units 21 of the invention are of very sturdy construction and the connectors 23, 29 and 30 may be made as strong as is necessary. From the improved construction provided by the invention, therefore, the individual components of a seat assembly are all strong and durable.

Modified construction

In the modified construction shown in Figure 3, the spring units 121 are similar in construction to the spring units 21 of Figures 1 and 2. The spring units 121, however, are arranged lengthwise in a bed or cot 100 having end members 101 and side members 102. The connectors between adjacent spring units 121 are otherwise similar. In a bed or cot, it is preferable to run the springs longitudinally instead of laterally as in a vehicle seat or davenport, because of the different nature of the load to be sustained and also because the end members 101, being shorter, are less subject to deformation by the load. The springs 121 may be connected directly to the side members 102 or to cables 103 extending from one end member 101 to the other.

In the use of the bed or cot 100, the load is transmitted from one spring unit 101 to the others by means of their connectors at their points of nearest approach. Here also, as in Figures 1 and 2, the spring units 121 have lateral as well as longitudinal resilience and also resilience in a direction perpendicular to the surface of the bed or cot.

Spring unit with lever arm

In the modification of Figure 4, the spring unit 221 is similar in construction to the spring units 21 and 121 previously described. Instead of being connected directly to the edge wire, the spring unit 221 is connected at one or both ends to a lever arm 222 having its upper end 223 connected to the end 224 of the spring unit 221 and having arms 225 and 226 preferably with a spring loop 227 therebetween. The lower end 228 of the lever arm 222 is connected to the edge wire or frame. This construction employing a lever arm 222 offers increased resilience, enabling the spring units to be kept under individual tension or compression as desired. The spring unit 221, like the spring units 21 and 121, possesses both longitudinal and lateral resilience.

By preformed in a permanent zig-zag configuration is meant that the spring portions from the center line 28 are alternately staggered and self-sustaining and are formed in the manner, so that they normally assume this shape when assembled and are therefore not placed under tension when loaded.

While a specific embodiment of the invention has been described and illustrated, it will be understood that various modifications may be made within the scope of the appended claims without departing from the spirit of the invention.

What I claim is:

1. A longitudinal spring element preformed into zig-zag configuration along a zig-zag axial line, said element comprising a single sinuously bent wire having curved portions alternately arranged on opposite sides of said axial line and tangent to zig-zag lines on opposite sides of said axial line and substantially parallel thereto, the alternate curved portions being joined by parallel straight portions oblique to said axial line.

2. A spring assembly comprising a frame, a series of longitudinal spring elements having their ends connected to said frame, each spring element being preformed into zig-zag configuration along a zig-zag axial line, and comprising a single sinuously bent wire having curved portions alternately arranged on opposite sides of said axial line and tangent to zig-zag lines on opposite sides of said axial line and substantially parallel thereto, the alternate curved portions being joined by parallel straight portions oblique to said axial line.

3. A spring assembly comprising a frame, a series of longitudinal spring elements having their ends connected to said frame, each spring element being preformed into zig-zag configuration along a zig-zag axial line, and comprising a single sinuously bent wire having curved portions alternately arranged on opposite sides of said axial line and tangent to zig-zag lines on opposite sides of said axial line and substantially parallel thereto, the alternate curved portions being joined by parallel straight portions oblique to said axial line, and said spring elements being slightly curved lengthwise between their points of connection with the frame to resist compressional forces.

4. A spring assembly comprising a frame, a series of longitudinal spring elements having their ends connected to said frame, each spring element being preformed into zig-zag configuration along a zig-zag axial line, and comprising a single sinuously bent wire having curved portions alternately arranged on opposite sides of said axial line and tangent to zig-zag lines on opposite sides of said axial line and substantially parallel thereto, the alternate curved portions being joined by parallel straight portions oblique to said axial line, and said spring elements being connected to adjacent spring elements at spaced intervals along said zig-zag line on opposite sides of said axial line.

FRANK J. HORTON.